(12) United States Patent
Lesartre et al.

(10) Patent No.: US 10,671,291 B2
(45) Date of Patent: Jun. 2, 2020

(54) ITERATIVE WRITE SEQUENCE INTERRUPT

(71) Applicant: HEWLETT PACKARD ENTERPRISE DEVELOPMENT LP, Houston, TX (US)

(72) Inventors: Gregg B Lesartre, Fort Collins, CO (US); Martin Foltin, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 74 days.

(21) Appl. No.: 15/770,753

(22) PCT Filed: Nov. 17, 2015

(86) PCT No.: PCT/US2015/061009
§ 371 (c)(1),
(2) Date: Apr. 24, 2018

(87) PCT Pub. No.: WO2017/086925
PCT Pub. Date: May 26, 2017

(65) Prior Publication Data
US 2018/0314437 A1  Nov. 1, 2018

(51) Int. Cl.
G06F 3/06   (2006.01)
G06F 13/24  (2006.01)
G06F 13/16  (2006.01)

(52) U.S. Cl.
CPC .......... *G06F 3/0611* (2013.01); *G06F 3/0659* (2013.01); *G06F 3/0679* (2013.01);
(Continued)

(58) Field of Classification Search
CPC .... G06F 3/0611; G06F 3/0659; G06F 3/0679; G06F 13/161; G06F 13/1689; G06F 2213/24
See application file for complete search history.

(56) References Cited

U.S. PATENT DOCUMENTS 5,831,906 A   11/1998  Yih et al.
6,807,609 B1  10/2004  Lemmon et al.
(Continued)

OTHER PUBLICATIONS

PCT/ISA/KR, International Search Report and Written Opinion, dated Aug. 17, 2016, PCT/US2015/061009, 9 pages.
(Continued)

*Primary Examiner* — Charles Rones
*Assistant Examiner* — Hewy H Li
(74) *Attorney, Agent, or Firm* — Hewlett Packard Enterprise Patent Department

(57) ABSTRACT

Example implementations relate to memory read requests. For example, an implementation may include tracking progress of an iterative write sequence to write data to a memory element of a memory module. A received read request is detected to be addressed to a memory bank that includes the memory element undergoing the iterative write sequence. Based on the tracked progress, a time is determined to interrupt the iterative write sequence with insertion of the read request. The time aligns between operations of the iterative write sequence and data is returned within a predetermined read latency.

20 Claims, 5 Drawing Sheets

(52) U.S. Cl.
CPC ............ *G06F 13/16* (2013.01); *G06F 13/161* (2013.01); *G06F 13/1668* (2013.01); *G06F 13/1689* (2013.01); *G06F 13/24* (2013.01); *G06F 2213/24* (2013.01)

(56) References Cited

U.S. PATENT DOCUMENTS

| | | |
|---|---|---|
| 7,562,180 B2 | 7/2009 | Gyl et al. |
| 7,619,922 B2 | 11/2009 | Li et al. |
| 8,004,884 B2 | 8/2011 | Franceschini et al. |
| 9,531,363 B2 * | 12/2016 | Miyano ................. H03K 5/135 |
| 9,941,014 B2 * | 4/2018 | Lee ........................ G11C 16/32 |
| 10,055,137 B2 * | 8/2018 | Madraswala ........... G06F 3/061 |
| 2003/0151951 A1 | 8/2003 | Aoki |
| 2003/0223285 A1 | 12/2003 | Khouri et al. |
| 2011/0026318 A1 * | 2/2011 | Franceschini ......... G06F 13/161 |
| | | 365/163 |
| 2011/0060875 A1 * | 3/2011 | Haukness ............... G11C 16/10 |
| | | 711/103 |
| 2011/0078392 A1 | 3/2011 | Chiras et al. |
| 2012/0179865 A1 | 7/2012 | Kudo et al. |
| 2014/0122822 A1 | 5/2014 | Mirichigni et al. |
| 2015/0355854 A1 * | 12/2015 | Song ..................... G06F 3/0619 |
| | | 711/103 |

OTHER PUBLICATIONS

Samyojita A. Nadkarni, "Development of Digital's PCI Chip Sets and Evaluation Kit for the DECchip 21064 Microprocessor," 1994, Digital Equipment Corporation, 21 pages.

* cited by examiner

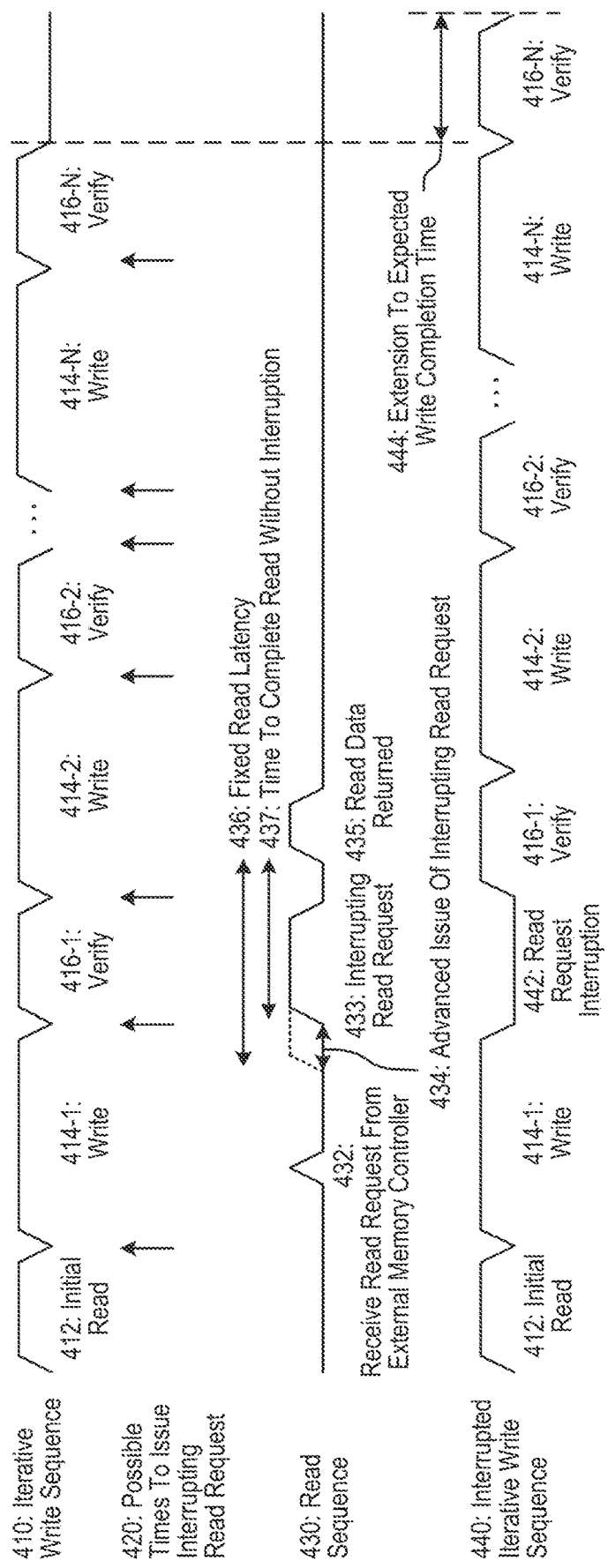
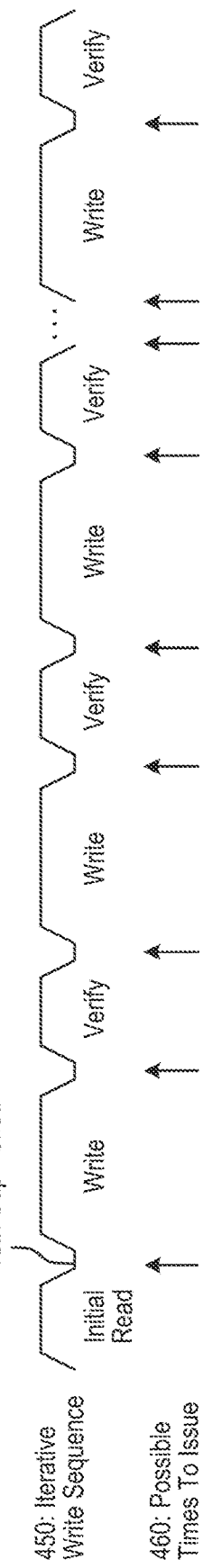
FIG. 4A
FIG. 4B

ITERATIVE WRITE SEQUENCE INTERRUPT

BACKGROUND

Data may be read from and written to memory devices. Memory devices may have longer write latencies, as compared to read latencies. Some memory device protocols are designed to achieve consistent read and write times.

BRIEF DESCRIPTION OF THE DRAWINGS

Various examples will be described below with reference to the following figures.

FIG. 4A is an example timing diagram of an iterative write sequence interrupted by a read request.

FIG. 4B is an example timing diagram of an iterative write sequence that can be interrupted by a read request.

Figure 1:
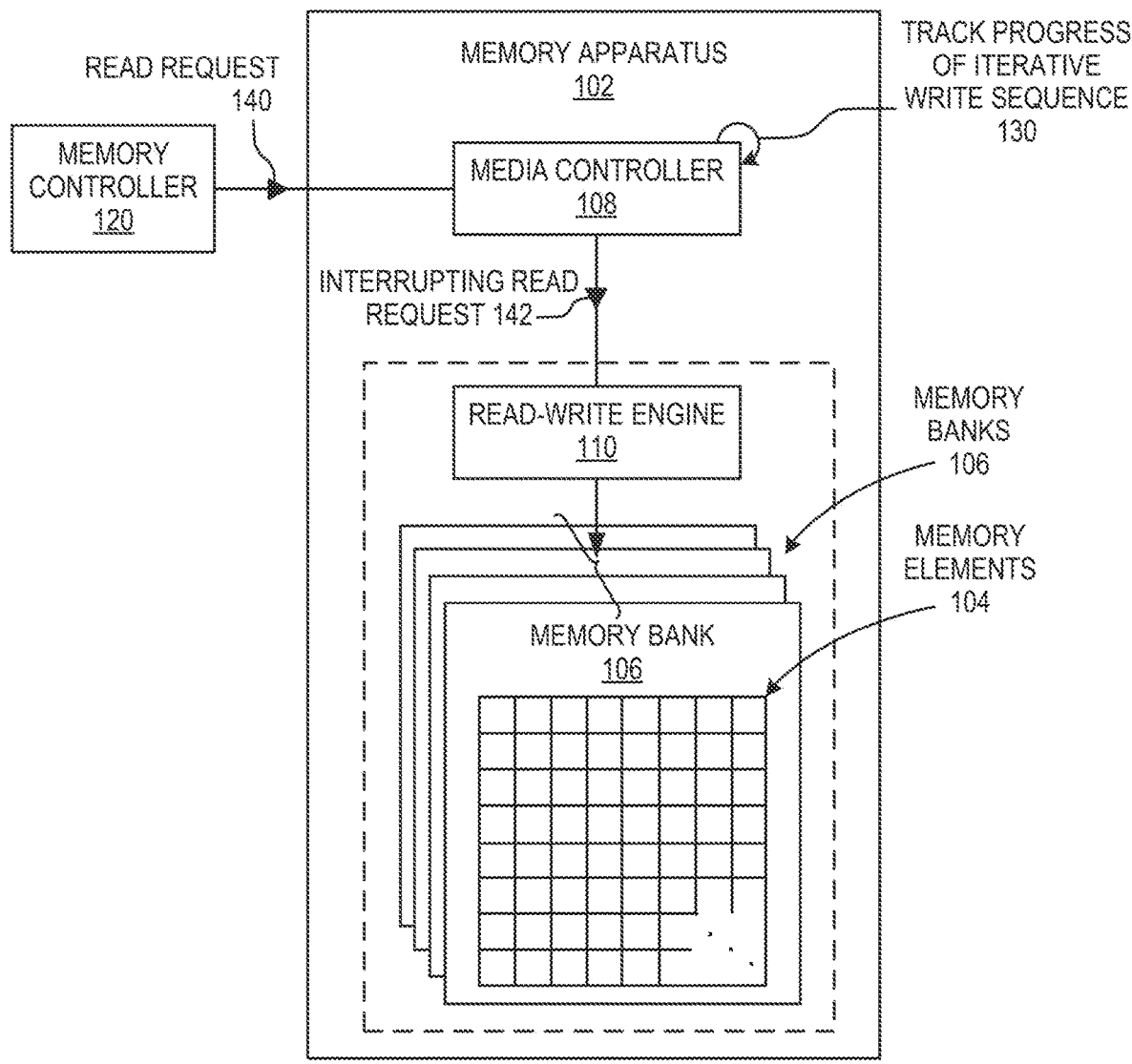
FIG. 1 is a block diagram that depicts an example memory apparatus, according to an implementation.

Throughout the drawings, identical reference numbers may designate similar, but not necessarily identical, elements. Use herein of a reference numeral without a hyphenated index number, where such reference numeral is referred to elsewhere with a hyphenated index number, may be a general reference to the corresponding plural elements, collectively or individually.

DETAILED DESCRIPTION

Memory devices may include multiple memory elements that store data. An example memory device may be a dual inline memory module (DIMM) having embedded thereon a double data rate (DDR) synchronous dynamic random-access memory (SDRAM) chip. A DIMM may have four, eight, or other numbers of DDR SDRAM chips. Each DDR SDRAM chip may include many volatile memory elements ordered into banks (arrays) of rows and columns. To read or write data (e.g., a one or zero) to a particular memory element, the corresponding row and column are activated to target the particular memory element. Some memory interface specifications, such as the DDR specifications (e.g., DDR2, DDR3, DDR4, LPDDR2, LPDDR3, LPDDR4), are designed to expect consistent (i.e., fixed) read and write timings and latencies.

Non-volatile memory (NVM) elements also may be organized into memory arrays and implemented on a memory module. Examples of non-volatile memory may include resistive random-access memory (also referred to as memristor memory), phase change memory, spin-transfer torque memory, or other types of persistent or non-volatile memory. In some cases, writing data to NVM may involve an iterative write sequence, where a write voltage is applied to a target memory element, the value written to the target memory element is verified (read and compared against the intended value), and the voltage is increased or the write parameters are otherwise modified for the next iteration of write-verify until the intended value is confirmed to have been written. Such an iterative write sequence may diminish or avoid potential NVM wear-out effects due to over-voltage and may improve NVM device longevity overall.

However, writing data by such an iterative write process may result in a comparatively lengthy write latency, relative to the read latency for reading data (where latency is an interval specified in absolute time, e.g., nanoseconds, or in clock cycles). In some cases, a data read operation may need to wait until an iterative write sequence is complete before the data read operation can be serviced, particularly when the data read operation and the ongoing write target the same region of memory (e.g., a same bank). In other words, an ongoing write operation may block a read operation to the same bank. Forcing the data read operation to wait in this manner may adversely affect the overall read performance of a computer system in which such NVM device is employed.

Example techniques of the present application may relate to, among other things, a memory apparatus or module that includes memory elements organized into memory banks, a read-write engine that can perform an iterative write sequence on the memory elements, and a media controller. The media controller may track progress of ongoing iterative write sequences; detect if a received read request is addressed to a memory bank that includes a memory element undergoing an iterative write sequence; determine, based on the tracked progress, a time to issue the read request so as to interrupt the iterative write sequence; and issue the read request to the read-write engine at the determined time. The time to issue the read request is determined so as to align between adjacent operations of the iterative write sequence and cause the read-write engine to return data within a fixed read latency expected by the media controller. Accordingly, the systems and techniques of the present description may be useful for allowing a read operation to bypass an ongoing iterative write sequence, while maintaining fixed latencies.

Referring now to the figures, FIG. 1 is a block diagram that depicts an example memory apparatus 102, according to an implementation. The memory apparatus 102 includes memory elements 104 organized into memory banks 106, a media controller 108, and a read-write engine 110.

The media controller 108 and the read-write engine 110 each may be any combination of hardware and programming to implement their respective functionalities as described herein. In some examples, such combinations of hardware and programming may be implemented in a number of different ways. For example, the programming may be processor executable instructions stored on a non-transitory machine readable storage medium and the hardware for the components may include a processing resource to retrieve and/or execute those instructions. For example, the processing resource may be a microcontroller, a microprocessor, central processing unit core(s), an application-specific integrated circuit (ASIC), a field programmable gate array (FPGA), and/or other hardware device suitable for retrieval and/or execution of instructions from the machine readable storage medium. Additionally or alternatively, the media controller 108 and/or the read-write engine 110 may include one or more hardware devices including electronic circuitry or logic for implementing functionality described herein.

The memory elements 104 store data, such as ones or zeroes, although other data values may be stored in some implementations. The memory elements 104 may be, for example, volatile memory elements or non-volatile memory elements (based on technologies such as, for example, memristor, phase change memory, spin-transfer torque memory, etc.). The memory elements 104 may be organized into memory banks 106. In some implementations, the memory elements 104 are arranged in a cross-point array (or multiple cross-point arrays) included in a memory bank 106.

A memory bank 106 also may include a row decoder to bias (to apply voltage to) rows (wordlines) of an array of memory elements 104, a column decoder to bias columns (bitlines) of the array of memory elements 104, and a sense amplifier (e.g., coupled to the column decoder) to detect a data value from a biased memory element. The media controller 108 may be coupled to the read-write engine 110, and the read-write engine 110 in turn may be coupled to the memory bank 106. The read-write engine 110 may activate the decoders to bias the memory elements 104 and may receive data from the sense amplifier.

In some examples, the memory apparatus 102 may include multiple memory chips, and each chip may include multiple memory banks 106 coupled to a read-write engine 110 (or respective read-write engines) on that chip. For example, in FIG. 1, a dashed boxed is depicted to illustrate that, in some implementations, the memory banks 106 and the read-write engine 110 may be included or packaged on the same memory chip. Although not depicted, some implementations of the memory apparatus 102 could have multiple dashed boxes representing multiple memory chips.

In some implementations, the memory elements 104 and the media controller 108 are embedded on a unitary memory module that is removably installable or installed into a computing system (e.g., a server, a workstation, a desktop computer, a laptop computer, or the like). For example, the memory apparatus 102 may be or form part of a unitary memory module (similar to, for example, a DIMM). When installed in a computing system, the memory apparatus 102 may form part of a system memory of the computing system. The memory apparatus 102 may communicate with the computing system, and more particularly, may communicate with a memory controller 120 of the computing system over a memory bus. The memory controller 120 may be external to the memory apparatus 102, and thus may be referred to also as an external memory controller 120 (at least with respect to the memory apparatus 102). Example communications may include read requests and write requests sent by the memory controller 120 to the memory apparatus 102.

In operation, the external memory controller 120 may send a data read request (which may include a logical memory address to read from) or a data write request (which may include a logical memory address and a value to be written to the address). The media controller 108 may process the read or write request received from the memory controller 120, and pass on the read or write request to the read-write engine 110 for execution. For example, the media controller 108 may translate a logical memory address included in the request to a physical memory address of particular memory bank(s) 106 and memory element(s) 104 for use by the read-write engine 110. In response to receiving the read or write request, the read-write engine 110 may read data from the addressed memory element(s) 104 or may write data to the addressed memory element(s) 104 by, for example, biasing the row(s) and column(s) that intersect at the particular memory elements as described above.

With respect to writing data in particular, the read-write engine 110 may write data by an iterative write sequence having operations including an initial read operation, write operations, and verify operations. For example, in response to a write request to write a value to a particular memory address, the read-write engine 110 may first perform an initial read operation that reads the memory address and determines whether the memory address already holds the value. If the memory address holds the value, the write request is deemed complete. If the memory address does not hold the value, the read-write engine 110 may proceed to iteratively perform write operations and verify operations until the value desired by the write request is attained at the memory address. That is, the read-write engine 110 may apply increasing voltages to the memory element 104 at the memory address and then read the memory address to test whether the value stored at the memory element 104 is the value requested by the write request. The foregoing iterative write sequence is performed individually for each bit (i.e., each individual memory element 104) involved in a particular write request. Thus, to illustrate, a memory element may undergo iterative write/verify sequence because it is determined from an initial read operation to not hold the intended value, while a neighboring memory element may not need to undergo a write sequence because it is determined by a separate initial read operation to already hold the intended value.

The media controller 108 may track progress (130) of an iterative write sequence performed by the read-write engine 110. That is, at any time after the media controller 108 issues a write request to the read-write engine 110, the media controller 108 may know what operation or phase of an iterative write sequence the read-write engine 110 is performing in response to the write request. By virtue of tracking the progress (130) of an iterative write sequence, the media controller 108 may also predict at what future time the read-write engine 110 will perform a particular operation of the iterative write sequence. In cases where the memory apparatus 102 has multiple memory banks 106 (or further still, multiple memory chips each with multiple memory banks 106), the media controller 108 may track progress (130) of all ongoing iterative write sequences performed among the multiple memory banks 106.

In some implementations, progress of an iterative write sequence in service of a write request may be tracked (130) by virtue of the operations of the iterative write sequence (initial read, write, and verify) each having predefined durations (e.g., in terms of clock cycles or absolute time) and the iterative write sequence having a predefined sequence of operations (initial read, write, verify, write, verify, and so on). The media controller 108 may thus utilize an incrementing counter to track when an interval equal to a predefined duration of an operation has elapsed and also may project what future counter value corresponds to a future operation. In some implementations, the predefined durations may be adjustable or programmable, and as such, the media controller 108 may fetch the predefined durations from registers of the memory apparatus 102 (more particularly, registers of the read-write engine 110).

The precision with which the media controller 108 tracks the iterative write sequence may depend on a number of variables. For example, the tracking precision may be a function of the granularity of the incrementing counter of the media controller 108. In some examples, achievable precision may be a function of design aspects of the memory apparatus 102, such as clock jitter, variations in signal flight times across wires, etc. In some examples, the read-write engine 110 may perform read, write, and verify operations according to a clock or timing source that is different from a clock used by the counter of the media controller 108, thus introducing some uncertainty performed into progress tracking by the media controller 108. As but one illustration, an example write latency may be on the order of microseconds while tracking precision may be on the order of nanoseconds.

In some implementations, the media controller 108 may operate under a fixed write latency. That is, once the media controller 108 issues a write request to the read-write engine 110, the media controller 108 expects that the write request will be complete within an interval specified by the write latency, which may be a value stored in a register of the media controller 108 or the read-write engine 110. The fixed write latency may be, for example, an interval that is sufficiently long to encompass the duration of iterative write sequences. In some examples, even though the durations of iterative write sequences may vary (e.g., depending on whether the initial read determines that the memory element already holds the value to be written or depending on how many write-verify cycles are performed to complete the write request), the write latency may be an interval that is longer than a worst case scenario of the iterative write sequence.

In a similar manner, the media controller 108 also may operate under a fixed (or predetermined) read latency. That is, once the media controller 108 issues a read request to the read-write engine 110, the media controller 108 expects that the read request will be complete within an interval specified by the read latency, which may be a value stored in a register of the media controller 108 or the read-write engine 110. At the end of the read latency interval (as determined by a counter of the media controller 108), the media controller 108 may expect to have the requested data transferred from the read-write engine 110 (or a buffer thereof).

As the media controller 108 receives read and write requests from the memory controller 120, the media controller 108 can detect a read request from the memory controller 120 that is addressed to a memory bank 106 that includes a memory element 104 undergoing an iterative write sequence.

The media controller 108 may determine, based on tracked progress 130 of the iterative write sequence, a time to issue the read request (i.e., to the read-write engine 110) to interrupt the iterative write sequence. In some implementations, the media controller 108 performs such a determination in response to detecting that the read request 140 is addressed to a memory bank 106 that includes a memory element 104 undergoing an iterative write sequence. The media controller 108 may then issue the interrupting read request 142 to the read-write engine 110 at the determined time.

The time to issue the interrupting read request 142 may be determined by the media controller 108 to be a time that aligns between adjacent operations of the iterative write sequence and that causes the read-write engine 110 to return data within a fixed read latency expected by the media controller 108. Alignment between adjacent operations of the iterative write sequence may refer, for example, to a time between an initial read operation and the following write operation, a time between a write operation and a verify operation, between a verify operation and a write operation, etc. In another example, the time to issue the read request 142 may be after a verify operation of the iterative write sequence. Accordingly, the media controller 108 may be deemed to insert the read request at a time between adjacent operations of the iterative write sequence.

Such alignment may cause the read-write engine 110 to return data within a fixed read latency expected by the media controller 108, because the read-write engine 110 will receive the read request at a time that allows for pausing the iterative write sequence (e.g., prior to starting the next operation of the sequence), transitioning to service the read request 142, and completing the read request 142, in substantially the same amount of time as if the iterative write sequence was not in progress.

To facilitate aligning the interrupting read request 142 between adjacent ones of the operations of the iterative write sequence, the media controller 108 may issue the interrupting read request 142 in advance of the transition between those adjacent operations, particularly to accommodate the tracking precision of the media controller 108. For example, a lower tracking precision may decrease how accurately the media controller 108 can project when the adjacent iterative write sequence operations will transition in the future, and accordingly, the media controller 108 can issue the interrupting read request 142 farther in advance of the transition. If the read request 142 is received at the read-write engine 110 in advance of the transition but before the read-write engine 110 can pause the iterative write sequence, the read request may wait in a buffer.

Issuing the interrupting read request 142 in advance in this manner may avoid a scenario where the read request 142 misses the intended transition between iterative write sequence operations, and must wait until the next transition, which may cause the read request to exceed or violate the fixed read latency expected by the media controller 108. Advanced issue of the interrupting read request 142 may be one factor in an interruption timing tolerance of the media controller 108 (or of the memory apparatus 102, more generally), that is, a safety margin for issuing an interrupting read request 142 and adhering to the fixed read latency.

In some implementations, the read-write engine 110 may include a gap period between adjacent ones of the operations of the iterative write sequence to increase interruption timing tolerance for interrupting read requests 142. For example, by virtue of spacing out the operations of the iterative write sequence, the media controller 108 may issue interrupting read requests 142 to the read-write engine 110 with relaxed (e.g., lower) tracking precision.

In some implementations, the time to issue the read request 142 (as determined by the media controller 108) may be at a point in the iterative write sequence when the memory bank containing the memory element undergoing the iterative write sequence is at least partially preconditioned in preparation for an ensuing verify operation (but prior to actually performing the verify operation). For example, the memory bank may be deemed preconditioned when the memory element or the row and column containing the memory element are activated or biased. In some examples, the memory bank may be deemed preconditioned when a reference voltage has been set for a sense amplifier of the memory bank.

Issuing the read request 142 to arrive at the read-write controller 110 when the memory bank is preconditioned may minimize the amount of time transitioning from servicing the iterative write sequence to servicing the interrupting read request 142, because the decoders are already at or close to the voltage to service the read request 142. In other words, the read-write engine 110 may avoid preconditioning the memory bank when servicing the interrupting read request 142. Saving time from not having to precondition the memory bank may provide a tolerance or buffer to hedge against progress tracking precision (e.g., uncertainties thereof). Alternatively, in some implementations, a shorter fixed read latency may be used by virtue of the read request being completed faster without preconditioning (in such cases, the media controller 108 may, for example, be configured to issue interrupting read requests 142 prior to verify operations but not prior to write operations).

As discussed above, once the media controller 108 issues a read request to the read-write engine 110, the media controller 108 may expect the read request to be completed within a fixed read latency. In particular, the fixed read latency may be preconfigured at the media controller 108 to be the sum of a period of time to complete read requests that do not interrupt iterative write sequences (which may depend on design and manufacture characteristics of the memory apparatus 102) and a predetermined read latency tolerance period allotted for interrupting read requests. For example, the read latency tolerance may be useful to accommodate voltage settling times, transition time in the read-write engine 110 for pausing the iterative write sequence and switching over to servicing the interrupting read request, and/or imprecision in tracking 130 by the media controller 108 of the iterative write sequence. The read latency tolerance may be related to the above-described advanced issue of an interrupting read request.

In some implementations, the same fixed read latency may apply to both read requests that interrupt iterative write sequences and read requests that do not interrupt iterative write sequences. By virtue of utilizing the same fixed read latency for both types of read request scenarios, the memory apparatus 102 may be compliant with memory interface specifications such as the DDR specifications.

In other implementations, the media controller 108 may maintain a first fixed read latency for read requests that interrupt iterative write sequences and a second fixed read latency for read requests that do not interrupt iterative write sequences. More particularly, the first fixed read latency may be greater than or equal to the second fixed read latency. For example, the first fixed read latency may include the read latency tolerance period described above, while the second fixed read latency does not.

Figure 2:
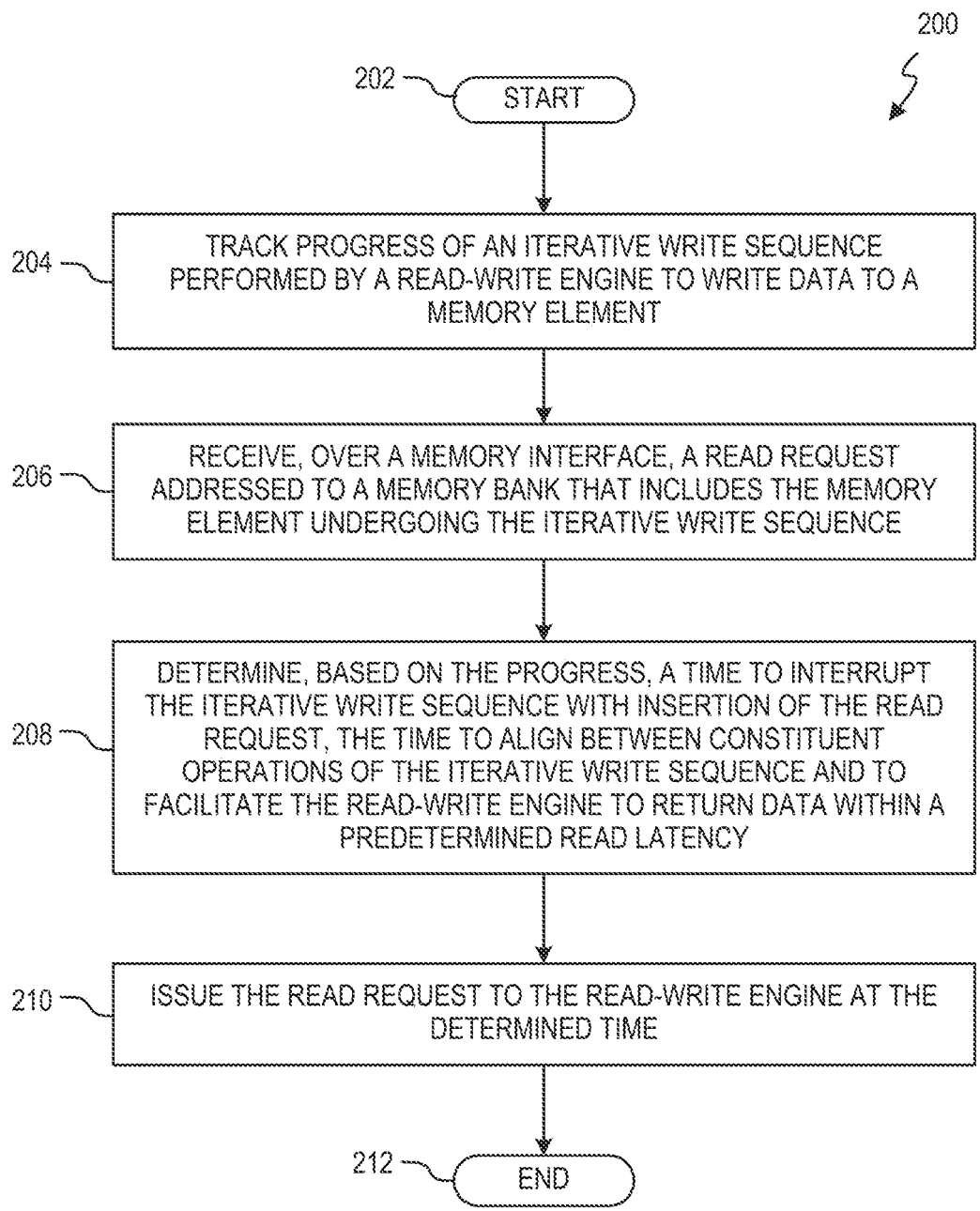
FIG. 2 is a flowchart of an example method that interrupts an iterative write sequence with a read request, according to an implementation.

FIG. 2 is a flowchart of an example method 200 for interrupting an iterative write sequence with a read request, according to an implementation. Method 200 may be implemented in the form of executable instructions stored on a machine readable storage medium and executed by a processing resource and/or in the form of electronic circuitry. For example, method 200 may be described below as being executed or performed by the media controller 108 of FIG. 1. In some implementations of the present disclosure, one or more blocks of method 200 may be executed substantially concurrently or in a different order than shown in FIG. 2. In some implementations of the present disclosure, method 200 may include more or less blocks than are shown in FIG. 2. In some implementations, one or more of the blocks of method 200 may, at certain times, be ongoing and/or may repeat.

The method 200 may begin at block 202, and continue to block 204, where a media controller (e.g., 108) of a memory module (which may be the memory apparatus 102) tracks progress of an iterative write sequence performed by a read-write engine (e.g., 110) of the memory module to write data to a memory element (e.g., 104) of the memory module. Block 204 may be ongoing until the iterative write sequence is complete, or until a predetermined (fixed) write latency has elapsed.

At block 206, the media controller may receive, over a memory interface (e.g., a memory bus), a read request (e.g., 140) addressed to a memory bank (e.g., 106) that includes the memory element undergoing the iterative write sequence tracked at block 204.

At block 208, the media controller may determine, based on the progress tracked at block 204, a time to interrupt the iterative write sequence with insertion of the read request. The time is determined (computed or chosen) to align between constituent operations of the iterative write sequence (including at least, e.g., a write operation and a verify operation) and to facilitate the read-write engine to return data within a predetermined (fixed) read latency.

In some implementations, the media controller may perform block 208 in response to detecting that the read request received at block 206 is addressed to the memory bank that includes the memory element undergoing the iterative write sequence. In some implementations, the time determined at block 208 to interrupt the iterative write sequence with insertion of the read request is at a time prior to a verify operation of the iterative write sequence when the memory bank that includes the memory element undergoing the iterative write sequence is preconditioned for the verify operation.

At block 210, the media controller issues the read request to the read-write engine at the determined time. The method 200 ends at block 212.

Figure 3:
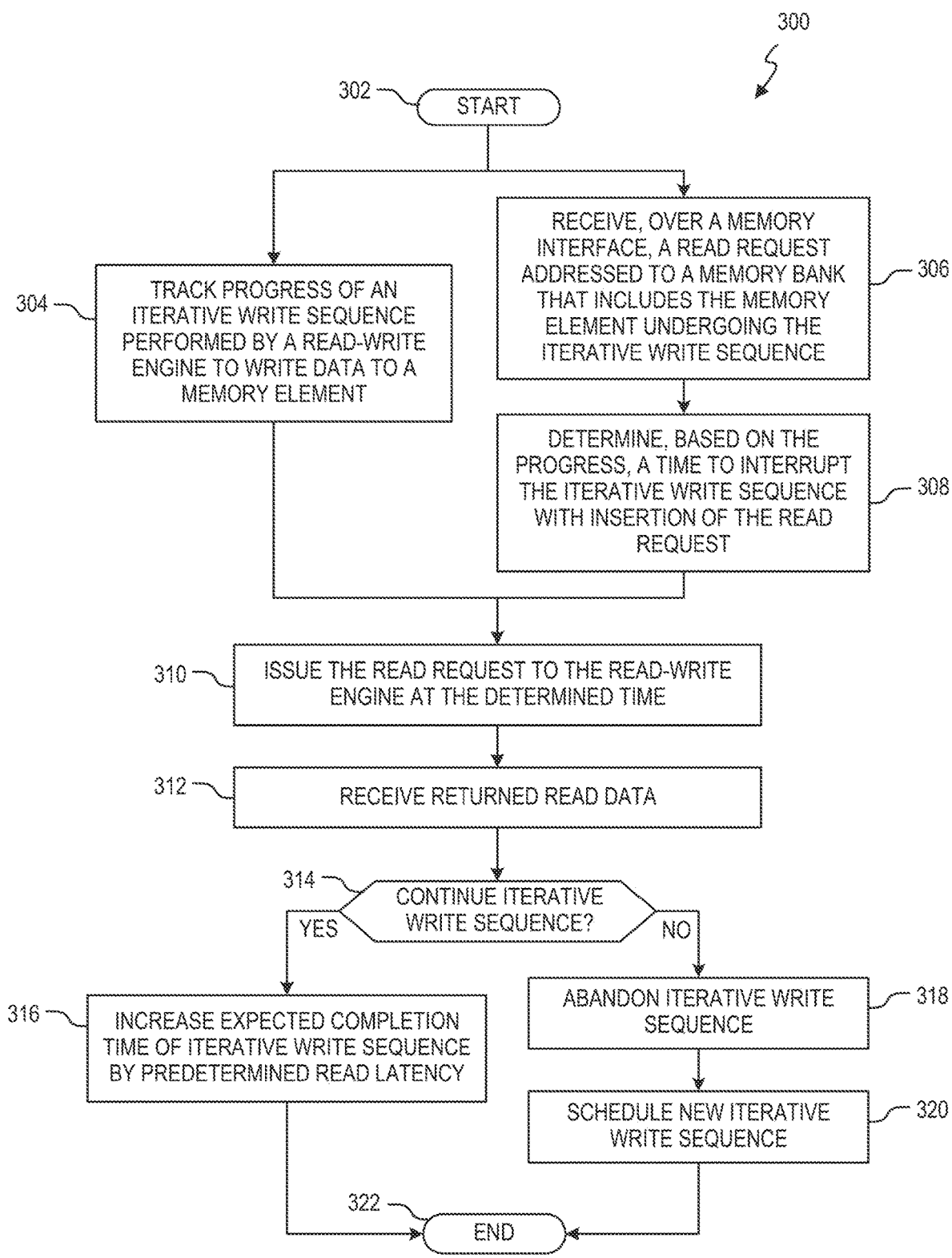
FIG. 3 is a flowchart of an example method that interrupts an iterative write sequence with a read request, according to another implementation.

FIG. 3 is a flowchart of an example method 300 for interrupting an iterative write sequence with a read request, according to another implementation. Method 300 may be implemented in the form of executable instructions stored on a machine readable storage medium and executed by a processing resource, and/or may be implemented in the form of electronic circuitry. As with method 200, method 300 may be executed or performed by the media controller 108. In some implementations of the present disclosure, one or more blocks of method 300 may be executed substantially concurrently or in a different order than shown in FIG. 3. In some implementations of the present disclosure, method 300 may include more or less blocks than are shown in FIG. 3. In some implementations, one or more of the blocks of method 300 may, at certain times, be ongoing and/or may repeat.

The method 300 may begin at block 302. Blocks 304, 306, 308, and 310 may be analogous in many respects to above-described blocks 204, 206, 208, and 210, respectively. For example, at block 304, a media controller (e.g., 108) may track progress of an iterative write sequence of a read-write engine (e.g., 110) to write data to a memory element (e.g., 104) of a memory module (e.g., 102). At block 306, the media controller may receive a read request (e.g., 140) addressed to a memory bank (e.g., 106) that includes the memory element undergoing the iterative write sequence tracked at block 304 (and deem such a read request to trigger interruption of the tracked iterative write sequence). At block 308, the media controller may determine a time to insert the interrupting read request in the iterative write sequence. At block 310, the media controller may issue the read request to the read-write engine.

In FIG. 3. block 304 is depicted as being performed in parallel with blocks 306 and 308. That is, as the media controller tracks progress of the iterative write sequence (e.g., using a counter) against an expected completion time of the iterative write sequence (e.g., a fixed write latency), the media controller may concurrently receive (306) a read request addressed to a memory bank that includes the memory element undergoing the iterative write sequence and determine (308) a time to interrupt the iterative write sequence with the read request.

At block 312, the media controller may receive returned read data, that is, data returned in response to the interrupting read request. In some implementations, the media controller may fetch or retrieve the data from the read-write engine or a buffer connected thereto.

At block 314, the media controller may determine whether to continue the interrupted iterative write sequence. In some implementations, the media controller may be configured by a user (e.g., a firmware modifiable register setting) to either continue or discontinue an interrupted iterative write sequence, and at block 314, the media controller may refer to that configuration.

If the iterative write sequence is to continue ("YES" at block 314), control passes to block 316, where the media controller may increase the expected completion time of the iterative write sequence by a time extension related to the predetermined read latency. For example, the time extension may be at least a time period of time to complete read requests that do not interrupt iterative write sequences, plus an additional tolerance period (e.g., to allow for transitions in the read-write engine or the memory banks, voltage setting times, and/or imprecision in the tracking at block 304). By virtue of extending the expected completion time, the media controller can provide that data written by the interrupted write request is actually stored in memory, before other operations (e.g., operations of a computing system in which the memory module is installed) attempt to access that data.

If the iterative write sequence is not to continue ("NO" at block 314), control passes to block 318, where the media controller may abandon the iterative write sequence after interruption by the inserted read request. At block 320, the media controller subsequently schedules a new iterative write sequence to replace the iterative write sequence abandoned at block 318. The method 300 ends at block 322.

FIG. 4A is a timing diagram illustrating an iterative write sequence interrupted by a read request, as performed by the memory apparatus 102 described above. FIG. 4A illustrates an iterative write sequence 410 performed by the read-write engine 110 to write a value to a memory element 104. The iterative write sequence 410 may include an initial read operation 412 followed by alternating write operations 414 (414-1 through 414-N) and verify operations 416 (416-1 through 416-N). The media controller 108 tracks progress through the iterative write sequence 410, including the current operation being performed.

As described above, when the media controller 108 detects that a read request (432, as will be described) received from the memory controller 120 is addressed to a memory bank that includes the memory element 104 undergoing the iterative write sequence 410, the media controller 108 may determine a time to issue the read request to interrupt the iterative write sequence 410. Depending on when in the iterative write sequence 410 the media controller 108 receives the read request, there exist multiple possible times 420 to issue the interrupting read request to the read-write controller 110. The possible times 420 (represented by arrows) include points of time between adjacent operations 412, 414, 416 of the iterative write sequence 410. In some implementations, the media controller 108 may issue the read request to the read-write engine 110 in advance of the transition to the next operations of the iterative write sequence 410, to allow for precision of the progress tracking, transmission time through the electronics, and/or processing time by the read-write engine 110 (e.g., recognition of the read request and triggering a pause to the iterative write sequence 410).

To illustrate, a read sequence 430 depicts the media controller 108 receiving a read request 432 from the external memory controller 120. Concurrently, the media controller 108 tracks progress of the ongoing iterative write sequence 410, and identifies that the read request 432 was received during the write operation 414-1. Based on tracked progress, the media controller 108 determines that the next available time to issue the read request 432 to the read-write engine 110 is between the write operation 414-1 and the verify operation 416-1, although other subsequent times may also be selected in other implementations. Accordingly, the media controller 108 issues the interrupting read request 433 to the read-write engine 110.

Alternatively, the media controller 108 may advance issue of the interrupting read request (434). How early the advanced read request issue 434 occurs in advance of the next iterative write sequence transition may be a function of the tracking precision of the media controller 108. In some implementations, a lower tracking precision may call for an earlier advance issue 434.

The read-write engine 110 receives the interrupting read request 433 (or 434) between the write operation 414-1 and the verify operation 416-1 in time to pause the iterative write sequence 410. For example, the pause alters the iterative write sequence 410, resulting in the interrupted iterative write sequence 440 having read request interruption 442. During the read request interruption 442, the read-write engine 110 services the interrupting read request 433 (e.g., performs a read operation to read the addressed memory element(s)) and stores the data result in a buffer. After the read operation, the read-write engine 110 resumes the iterative write sequence 440 by performing the verify operation 416-1 and so on, until the desired value is written.

The media controller 108 may increase an expected completion time of the original iterative write sequence 410 by a time extension 444 related to the predetermined read latency, resulting in an expected completion time for the interrupted iterative write sequence 440. For example, the time extension 444 may be at least a time period needed to complete read requests that do not interrupt iterative write sequences, and also may include an additional tolerance period (e.g., to allow for transitions in the read-write engine or the memory banks, voltage setting times, and/or imprecisions in tracking the iterative write sequence).

Referring again to the read sequence 430, the media controller 108 waits (via counters) a fixed read latency 436 after issuance of the interrupting read request 433 (or 434) and then receives or fetches (at 435) the read data stored in the buffer (resulting from service of the read request 433 or 434). For example, the fixed read latency 436 may be at least a duration 437 to complete read requests that do not interrupt an iterative write sequence, and in some implementations, may be longer than duration 437 to allow for occurrences related to servicing an interrupting read request, such as advanced issue (e.g., to compensate for lower tracking precision), voltage settling times in the memory bank, read-write engine 110 transition time for pausing the iterative write sequence and switching over to service of the interrupting read request, etc.

FIG. 4B is an example timing diagram of an iterative write sequence that can be interrupted by a read request, according to another implementation of the memory apparatus 102. In particular, the iterative write sequence 450 of FIG. 4B is performed by a read-write engine 110 that provides a brief gap period 452 between adjacent operations of the iterative write sequence 450 to increase interruption timing tolerance for interrupting read requests. By virtue of the gap periods 452, the media controller 108 may issue interrupting read requests to the read-write engine 110 with relaxed (e.g., lower) tracking precision, while still providing that the interrupting read requests are received at the read-write engine 110 between adjacent operations of the iterative write sequence 450 (e.g., at the possible times 460).

Figure 5:
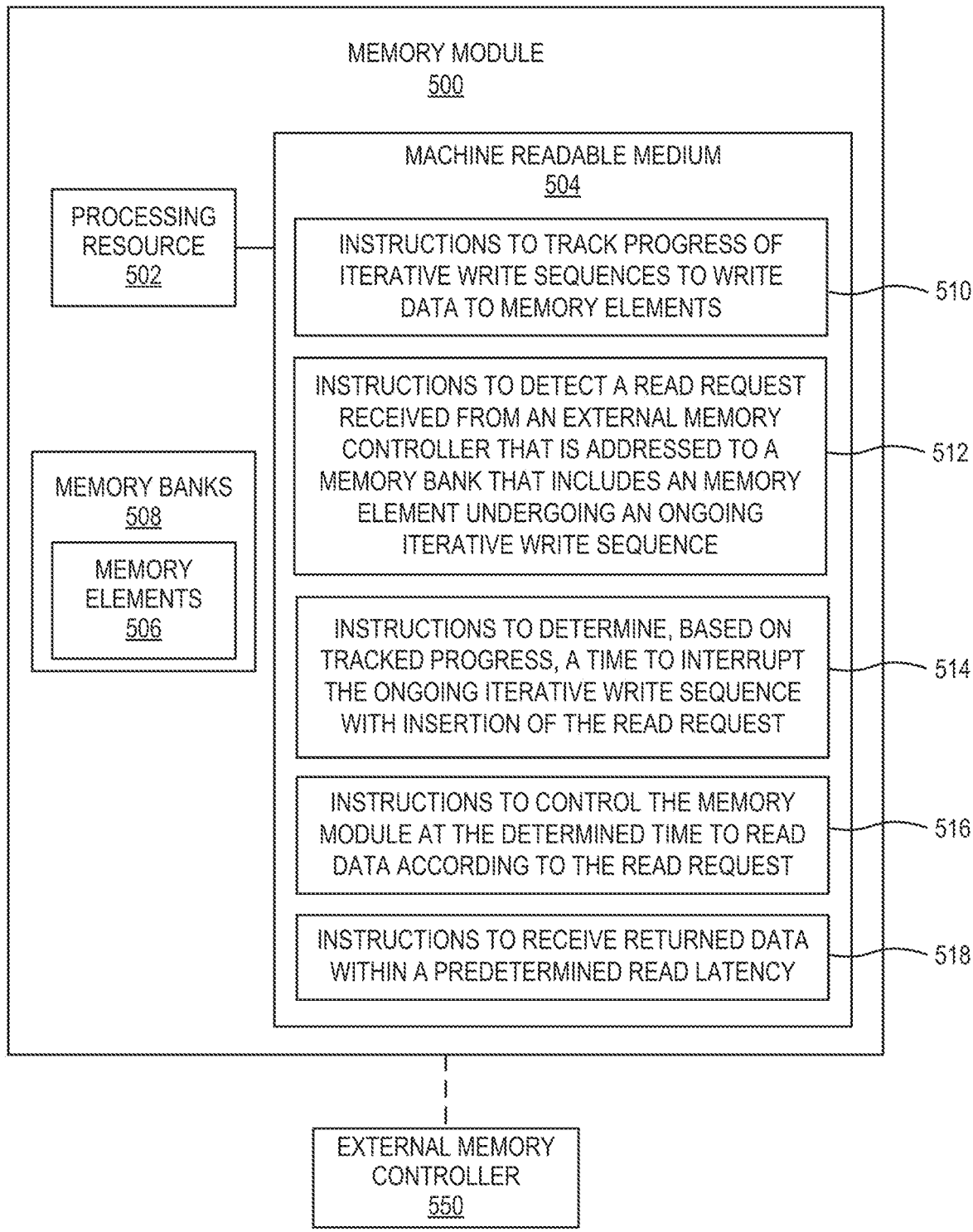
FIG. 5 is a block diagram of a memory module that includes a non-transitory, machine readable medium encoded with example instructions to interrupt an iterative write sequence with a read request, according to an implementation.

FIG. 5 is a block diagram of a memory module that includes a non-transitory, machine readable medium encoded with example instructions to interrupt an iterative write sequence with a read request, according to an implementation. In some implementations, the memory module 500 may include at least one processing resource 502 coupled to a machine readable medium 504. The memory module 500 also may include memory elements 506 organized into memory banks 508.

The memory module 500 may be removably installable in a computing system (e.g., a server, a workstation, a desktop computer, a laptop computer, or the like), and when so installed, may communicate with an external memory controller 560 of the computing system. In some implementations, the memory module 500 may serve as or form part of the memory apparatus 102 of FIG. 1. In particular, the processing resource 502 coupled to the machine readable medium 504 may serve as or form part of the media controller 108 of FIG. 1.

The processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples. Additionally or alternatively, the processing resource 502 may include electronic circuitry for performing the functionality of the instructions described herein.

The machine readable medium 504 may be any medium suitable for storing executable instructions, such as random access memory (RAM), read-only memory (ROM), electrically erasable programmable read-only memory (EEPROM), flash memory, a hard disk drive, an optical disc, or the like. In some example implementations, the machine readable medium 504 may be a tangible, non-transitory medium, where the term "non-transitory" does not encompass transitory propagating signals. The machine readable medium 504 may be disposed within the memory module 500, as shown in FIG. 5, in which case the executable instructions may be deemed "installed" or "embedded" on the memory module 500. Alternatively, the machine readable medium 504 may be a portable (e.g., external) storage medium, and may be part of an "installation package."

As described further herein below, the machine readable medium 504 may be encoded with a set of executable instructions 510, 512, 514, 516, 518. It should be understood that part or all of the executable instructions and/or electronic circuits included within one box may, in alternate implementations, be included in a different box shown in the figures or in a different box not shown.

Instructions 510, when executed by the processing resource 502, track progress of iterative write sequences to write data to memory elements 506 of the memory module 500. For example, in some instances, multiple writes can be serviced concurrently across the memory banks 508 of the memory module 500. More particularly, instructions 510 may track expected completion times of the iterative write sequences. For example, expected completion times may relate to a predetermined (fixed) write latency associated with the memory module 500.

Instructions 512, when executed by the processing resource 502, detect a read request received from an external memory controller 550 that is addressed to a memory bank (of the banks 508) of the memory module 500 that includes a memory element (of the elements 506) undergoing an ongoing iterative write sequence.

Instructions 514, when executed by the processing resource 502, determine, based on progress tracked by instructions 510, a time to interrupt the ongoing iterative write sequence with insertion of the read request (received and detected at instructions 512). The insertion time determined by instructions 514 is to align between discrete constituent operations of the iterative write sequence tracked by instructions 510. In some implementations, the discrete constituent operations include a write operation followed by a verify operation, and the insertion time determined by instructions 514 is to interrupt the ongoing iterative write sequence at either a time after completion of a verify operation or at a time prior to a verify operation when the memory bank (of 508) that includes the memory element undergoing the iterative write sequence is preconditioned for the verify operation.

Instructions 516, when executed by the processing resource 502, control the memory module 500 at the time determined by instructions 514 to read data according to the read request. For example, the instructions 516 may issue the read request to a read-write engine coupled to the memory banks 508 (e.g., analogous to the read-write engine 110 described above).

Instructions 518, when executed by the processing resource 502, receive returned data within a predetermined read latency. For example, the processing resource 502 may fetch the data from the aforementioned read-write engine after the predetermined read latency has elapsed since instructions 516 were performed.

In some implementations, the instructions 510 may be ongoing through execution of instructions 512, 514, 516, 518. In such implementations, the instructions 510 may increase an expected completion time of an iterative write sequence that is interrupted by read request insertion. The expected completion time may be increased by a time extension related to the predetermined read latency. For example, the expected completion time may be increased by the amount of time the memory module 500 takes to complete read requests that do not interrupt iterative write sequences plus an additional tolerance period.

In view of the foregoing description, it can be appreciated that a read request addressed to a memory bank subject to an ongoing iterative write sequence need not be delayed until the write sequence is complete, but may interrupt the write sequence, thus reducing read latencies in memories that utilize an iterative write process. Additionally, by virtue of tracking progress of an ongoing iterative write sequence and injecting the read request at a point between discrete operations of the iterative write sequence, the read request can be serviced in a similar amount of time as a read request that does not interrupt an ongoing write sequence, thus providing compatibility with memory interfaces that utilize a single read latency.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A memory apparatus comprising:
   memory elements organized into memory banks;
   a read-write engine to:
      write data to a memory element by an iterative write sequence having operations including an initial read operation, write operations, and verify operations, and
      read data from the memory elements; and
   a media controller to:
      track progress of the iterative write sequence,
      detect a read request from an external memory controller that is addressed to a memory bank that includes the memory element undergoing the iterative write sequence,
      determine, based on the tracked progress, a time to issue the read request to interrupt the iterative write sequence, the time to align between adjacent operations of the iterative write sequence and to cause the read-write engine to return data within a fixed read latency expected by the media controller, and
      issue the read request to the read-write engine at the determined time,
   wherein the fixed read latency is preconfigured at the media controller to be a sum of a period of time to complete read requests that do not interrupt iterative write sequences and a predetermined read latency tolerance period allotted associated with interrupting read requests.

2. The memory apparatus of claim 1, wherein the determined time to issue the read request is at a time prior to a verify operation of the iterative write sequence when the memory bank that includes the memory element undergoing the iterative write sequence is preconditioned for a verify operation.

3. The memory apparatus of claim 1, wherein the determined time to issue the read request is after a verify operation.

4. The memory apparatus of claim 1, wherein the same fixed read latency applies to both read requests that interrupt iterative write sequences and read requests that do not interrupt iterative write sequences.

5. The memory apparatus of claim 1, wherein the media controller maintains a first fixed read latency for read requests that interrupt iterative write sequences and a second fixed read latency for read requests that do not interrupt iterative write sequences, the first fixed read latency being greater than or equal to the second fixed read latency.

6. The memory apparatus of claim 1, wherein the read-write engine includes a gap period between adjacent ones of the operations of the iterative write sequence to increase timing tolerance for interrupting read requests.

7. The memory apparatus of claim 1, wherein the memory elements and the media controller are embedded on a unitary memory module that is removably installable into a computing system, and
   the memory elements are non-volatile memory elements.

8. The memory apparatus of claim 1, wherein the media controller tracks an expected completion time of the iterative write sequence, and
   the media controller increases the expected completion time by a time extension related to the predetermined read latency.

9. The memory apparatus of claim 1, wherein the media controller is to:
   abandon the iterative write sequence after interruption by the read request at the determined time; and
   schedule a new iterative write sequence to replace the abandoned iterative write sequence.

10. A method comprising:
    tracking, by a media controller of a memory module, progress of an iterative write sequence performed by a read-write engine of the memory module to write data to a memory element of the memory module;
    tracking, by the media controller, an expected completion time of the iterative write sequence;
    receiving, over a memory interface and at the media controller, a read request addressed to a memory bank that includes the memory element undergoing the iterative write sequence;
    determining, by the media controller and based on the progress, a time to interrupt the iterative write sequence with insertion of the read request, the time to align between constituent operations of the iterative write sequence and to facilitate the read-write engine to return data within a predetermined read latency;
    increasing, by the media controller, the expected completion time by a time extension related to the predetermined read latency; and
    issuing, by the media controller to the read-write engine, the read request at the determined time.

11. The method of claim 10, wherein the constituent operations include a write operation and a verify operation, and
    the determined time to interrupt the iterative write sequence with insertion of the read request is at a time prior to the verify operation when the memory bank that includes the memory element undergoing the iterative write sequence is preconditioned for a verify operation.

12. The method of claim 10, further comprising:
    abandoning the iterative write sequence after interruption by an inserted read request; and
    scheduling a new iterative write sequence to replace the abandoned iterative write sequence.

13. The method of claim 10, wherein the determined time to issue the read request to interrupt the iterative write sequence is after a verify operation of the iterative write sequence.

14. The method of claim 10, further comprising maintaining, by the media controller, a first predetermined read latency for read requests that interrupt iterative write sequences and a second predetermined read latency for read requests that do not interrupt iterative write sequences, the first predetermined read latency being greater than or equal to the second predetermined read latency.

15. The method of claim 10, wherein the predetermined read latency is preconfigured at the media controller to be a sum of a period of time to complete read requests that do not interrupt iterative write sequences and a predetermined read latency tolerance period allotted associated with interrupting read requests.

16. A non-transitory machine readable medium storing instructions executable by a controller of a memory module, the non-transitory machine readable medium comprising:
    instructions to track progress of iterative write sequences to write data to memory elements of the memory module;
    instructions to detect a read request received from an external memory controller that is addressed to a memory bank of the memory module that includes a memory element undergoing an ongoing iterative write sequence;

instructions to determine, based on the tracked progress, a time to interrupt the ongoing iterative write sequence with insertion of the read request, the time to align between discrete constituent operations of the iterative write sequence wherein the discrete constituent operations include a write operation followed by a verify operation, and the time is prior to the verify operation when the memory bank that includes the memory element undergoing the iterative write sequence is preconditioned for the verify operation;

instructions to control the memory module at the determined time to read data according to the read request; and instructions to receive returned data within a predetermined read latency.

17. The non-transitory machine readable medium of claim 16, wherein the instructions to track progress are to further track expected completion times of the iterative write sequences, and to increase an expected completion time of an iterative write sequence that is interrupted by read request insertion by a time extension related to the predetermined read latency.

18. The non-transitory machine readable medium of claim 16, further comprising instructions to maintain a first predetermined read latency for read requests that interrupt iterative write sequences and a second predetermined read latency for read requests that do not interrupt iterative write sequences, the first predetermined read latency being greater than or equal to the second predetermined read latency.

19. The non-transitory machine readable medium of claim 16, further comprising instructions to preconfigure the predetermined read latency to be a sum of a period of time to complete read requests that do not interrupt iterative write sequences and a predetermined read latency tolerance period allotted associated with interrupting read requests.

20. The non-transitory machine readable medium of claim 16, further comprising:

instructions to abandon the iterative write sequence after interruption by the memory module to read data at the determined time; and instructions to schedule a new iterative write sequence to replace the abandoned iterative write sequence.

* * * * *